Patented Dec. 2, 1947

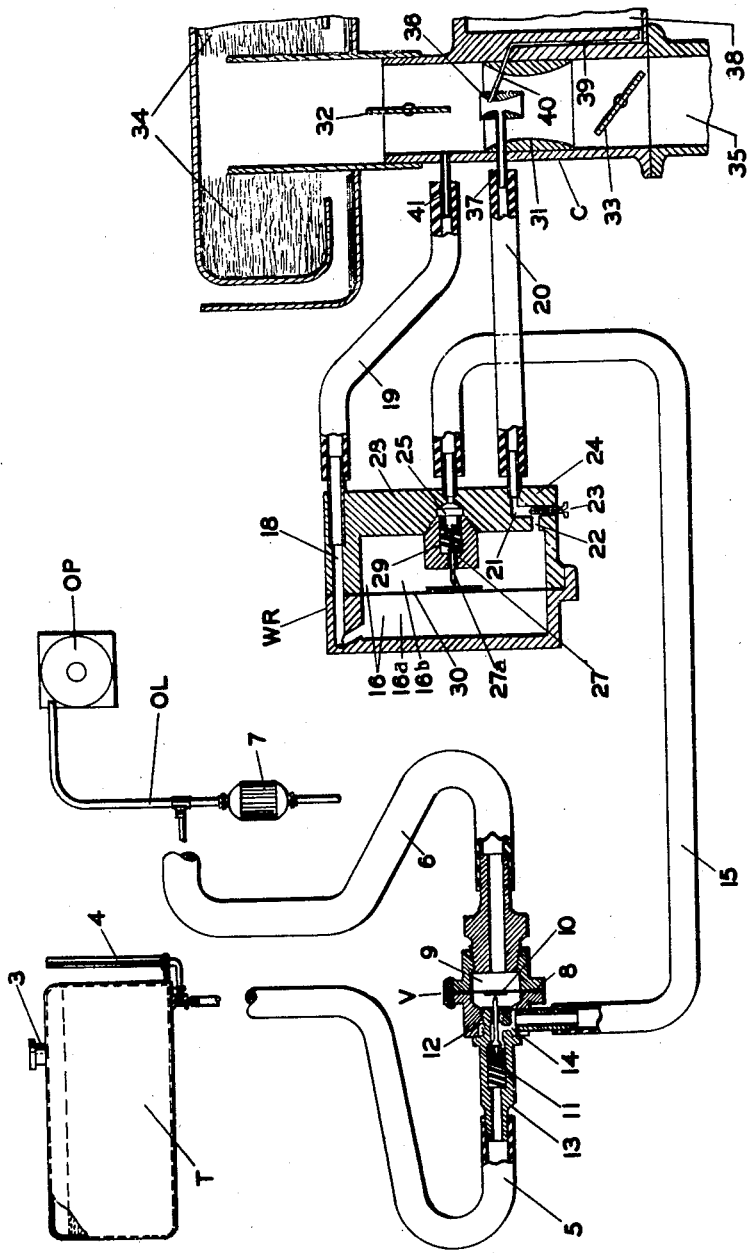

2,431,679

UNITED STATES PATENT OFFICE 2,431,679

WATER INJECTION SYSTEM

Paul F. Adair, Dayton, Ohio

Application January 5, 1945, Serial No. 571,485

15 Claims. (Cl. 123—25)

(Granted under the act of March 3, 1883, as amended April 30, 1928; 370 O. G. 757)

The invention described herein may be manufactured and used by or for the Government for governmental purposes, without the payment to me of any royalty thereon.

This invention relates in general to a water injection system for internal combustion engines, and is more particularly described at it applies to automobile engines.

An important object of the invention is to provide a new and improved system for injecting small or measured quantities of water into the fuel and air mixture which is fed to an internal combustion engine by a carburetor.

A further object of the invention is to improve the performance of an internal combustion engine using low grade fuel by slowing down the burning rate or combustion of the fuel-air mixture to approximate the effect obtained with tetraethyl fuel mixtures.

A further object of the invention is to reduce detonation in the engine and to prevent the formation of excessive carbon deposits and high combustion temperatures causing deterioration of pistons, cylinders, valves and bearings which results in sluggish engine performance, high fuel and oil consumption, and general unsatisfactory operation.

A further object is the provision of means for injecting water into a fuel mixture supplied to an internal combustion engine in a predetermined ratio to the rate of admission of the fuel mixture to the engine.

Another object is the provision of means for injecting water into a carburetor Venturi fuel mixture passage having an adjacent fuel supply means in said passage, in predetermined ratio to the rate of movement of the fuel mixture through said passage, to vary the degree of fuel richness of the mixture passing through said passage in a predetermined ratio to the velocity of the mixture passing through the passage.

A further object is the provision of an attachment for internal combustion engine fuel-air explosive mixture supply apparatus for supplying water to the explosive mixture in the fuel supply passage in a predetermined ratio to the velocity of the explosive mixture passing through passage to the engine, to vary ratio of fuel-to-air in the mixture in proportion to predetermined variations in the said velocity.

A still further object of the invention is to provide suitable apparatus and controlling means which may be applied to internal combustion engines now in operation, with a minimum amount of time, difficulty, and expense, for automatically injecting a predetermined amount of water or other liquid into the engine fuel intake system depending upon the speed or load on the engine.

Other objects and advantages of the invention will become apparent in the following specification taken in connection with the accompanying drawing, in which like reference characters refer to like parts in the drawing.

The single figure is a diagrammatic view, with many of the parts shown in section, illustrating the application of the present invention as a system applied to the carburetor of an internal combustion engine, with a master valve controlled by the pressure of oil from the engine oil pump.

When water is added to the fuel-air mixture, the combustion temperature drops and detonation is eliminated or reduced. This results in smoother engine operation, cleans carbon from combustion chambers, produces an effect like super-heated steam, and a quicker engine pickup. Spark plug fouling is reduced, while the plug life is increased, and fuel and oil consumption is more efficient, and top engine performance is obtained.

Referring now more particularly to the single figure of the drawing, water is supplied from a tank T through a diaphragm valve V in accordance with the engine oil pressure applied by an engine driven pump OP to an oil line OL. A water regulator device WR is provided having a diaphragm 30 for receiving differential pressures on opposite sides thereof from a carburetor C. A water feed valve 27 is actuated by the diaphragm for controlling the metering and flow of the water into the carburetor.

Although the water or other liquid being employed may be supplied from any suitable source of supply, it is preferably supplied from a tank T suitably located under the hood of the automobile employing the device or located in any accessible place. The water tank is provided with a filler cap 3 for replenishing the supply, and a sight gage 4 connected to the tank for easily determining the amount of liquid in the tank. Leading from the bottom of the tank is a tubular conduit 5 which extends to the diaphragm actuated valve V.

Connected to the diaphragm valve V is a tubular conduit 6 extending from the engine oil pressure line OL, the engine oil being circulated therethrough under pressure to and through an oil filter 7, the tubular conduit 6 is connected with the oil filter pressure supply line OL before the oil enters the filter 7 so that the oil pressure is applied to the right face of the diaphragm 10, and movement of the diaphragm 10 by the oil pressure unseats the spring loaded water control valve 11.

The diaphragm valve V comprises a fitting 8 having a chamber 9 with the diaphragm 10 extending transversely across, dividing the chamber into a pressure compartment to which the oil pressure line 6 is connected and into an opposite compartment into which the stem of the water control valve 11 extends. The valve is held upon a seat 12 by a spring 13 normally pressing the valve on the seat and in a direction toward the diaphragm 10, and preventing flow of water or liquid past the valve.

When the oil in the conduit 6 is not under pressure, the valve 11 is held upon its seat 12 by the spring 13 and the stem of the valve 11 is free from engagement with the diaphragm 10. When the engine is operating so that a pressure is developed in the oil line OL to the filter 7, this pressure is communicated through the tubular conductor 6 to the diaphragm chamber 9, actuating the diaphragm 10 to open the water control valve 11.

A water discharge pipe 14 is connected from the diaphragm valve receiving passage of the valve V below the seat 12, so that water or other liquid being used will flow past the valve seat into the pipe 14 when the valve 11 is opened. Connected to the discharge pipe 14 is a tubular supply conduit 15 leading to the water regulator WR.

The water regulator WR is provided with a chamber 16 having a diaphragm 17 therein, dividing the chamber into high and low pressure compartments 16a, 16b. The regulator is usually made in separable parts between which the diaphragm 17 is clamped, securing it in the chamber and making the compartment portions 16a and 16b fluidtight. Extending through the water regulator WR to the high pressure compartment side 16a of the chamber 16 is a passage 18 connected by a tubular conduit 19 to the air inlet of the engine carburetor C. Extending from the low pressure compartment side 16b of the chamber 16 and connected to the carburetor in advance of the former connection is a low pressure tubular connection 20. This low pressure connection 20 has a metering inlet which is formed in the casing of the water regulator WR for limiting and controlling average rate of flow of the liquid to the fuel inlet passage of the carburetor. As shown in the present arrangement, there is a bore 21 extending inwardly from the outer face of the water regulator WR toward the compartment 16b. An adjacent inwardly projecting recess or bore 22 extends outwardly from the low pressure side 16b of the chamber 16 overlapping the bore 21. The two bores 21 and 22 are located adjacent each other with a threaded communicating passage 24 therebetween so that a threaded needle valve stem or screw 23 may be inserted into the passage from the outside of the water regulator through the threaded opening into the connecting passage 24 between the two bores 21 and 22, the screw 23 being more or less inserted into the intermediate passage 24 somewhat loosely at the tip similar to a needle valve to regulate the flow of the liquid, depending upon the adjustment of the needle valve screw 23.

To admit liquid automatically to the low pressure side 16b of the chamber 16 of the water regulator WR, the tubular conduit 15 is connected to a bore 25 through the water regulator casing having a valve support 26 therein, inserted from the inside of the chamber 16 of the water regulator with a water control valve 27 therein, held against a seat 28 by a spring 29, tensioning the valve in a direction to prevent water from entering the low pressure side of the chamber 16 from the pipe 15. The stem 27a of the valve 27 extends to a point adjacent the diaphragm 17 which is provided with a contact plate 30 adapted to engage the end of the valve stem 27a when the diaphragm is sufficiently deflected toward the valve 27 raises the valve from its seat, allowing water to enter the low pressure side 16b of the chamber 16 from the pipe 15.

The carburetor C is represented as having a Venturi nozzle or section 31 intermediate a choke valve 32 and a throttle valve 33. At the top of the carburetor is an air filter 34 and an engine intake manifold 35 connects the explosive mixture passage of the carburetors to the engine (not shown).

A second or boost venturi 36 is mounted centrally within and at the front edge portion of the Venturi fitting 31, being held in place by a hollow threaded stem 37 inserted into the Venturi fitting 31, extending through wall of the carburetor fuel mixture passage. A fuel supply chamber 38 located at one side of the carburetor has a fuel delivery passage 39 leading therefrom, and a fuel discharge pipe 40 extending through the wall of the fuel mixture supply passage, into the interior of the boost Venturi fitting 36 for admitting fuel to the air passing through the fuel mixture passage of the carburetor to the engine.

To provide differential pressures for operating the diaphragm 17 of the water regulator WR, a tubular fitting 41 is inserted through the wall of the carburetor fuel mixture supply passage in advance of the carburetor venturi, and also in advance of the boost venturi. The tubular pipe 19 is connected to this tubular fitting 41. This provides a pressure connection which leads to the pressure side 16a of the chamber 16 of the water regulator WR. The tubular conductor 20 is connected at one end to the threaded pipe 37 and at the other end to the bore 21, forming the low pressure connection with the carburetor since the pipe 37 extends into the venturi 31 at the low pressure side of the venturi.

With the connection between the carburetor and the water regulator WR, differential pressures are provided at opposite sides of the diaphragm 17 of the water regulator, sufficient to flex the diaphragm to open the valve 27 to admit water to the regulator and the water being admitted will be metered by the needle valve 23 and discharged into the carburetor through the nipple 37.

To obtain maximum efficiency with this water injection system, it is necessary that the water starts to flow at an engine speed slightly lower than that at which the main fuel nozzle starts to discharge fuel. Raising the water regulator WR causes more of the water to flow into the carburetor at lower engine speed and lowering the water regulator causes less water to flow into the carburetor at a relatively higher engine speed. It has been found that in order to obtain the best performance with water, it is necessary that the water consumption be approximately 25% by volume with respect to the fuel consumption.

With my improved apparatus, the rate of water flow and the operation is entirely automatic and once adjusted and set requires no further attention during its operation except for the replenishment of the water supply. Water is shut off automatically as soon as the engine is stopped because the oil pressure is discontinued, permitting the diaphragm valve V to close, interrupting the water supply. The amount of water which is delivered to the carburetor depends upon the adjustment of the metering device 23 and the velocity of the fuel-air mixture passing through the Venturi passage in the carburetor.

Water is introduced by the jet or nipple 37, located rearwardly with respect to the fuel inlet jet 36, the velocity of the air or fuel passing through the Venturi passage 31, and passing through the booster venturi 36 determines the pressure differential between the chambers 16a and 16b, and opening action of the valve 27 by the diaphragm 30. The metering pin 23 regulates the rate of water flow through the conduit 20 in proportion to the suction in the booster venturi 36 and the rate of fuel flow.

Since the water is introduced at the rear of the fuel jet 36, the water being so introduced reduces the suction on the fuel nozzle 36 and consequently as the rate of water flow increases, due to increased engine power demands, by opening the throttle valve 33, the ratio of fuel to air mixture is reduced. As the engine speed increases, the water delivered to the carburetor mixture increases, but the amount of fuel introduced is relatively decreased, deriching the mixture.

While I have disclosed my invention as applied to a carburetor having a boost venturi therein, the invention is equally applicable to a carburetor having the usual single fuel jet tube located within the venturi. In this instance, the water supply jet would be located in the venturi just to the rear of the fuel jet tube. The operation would be the same. The pressure differential between the fuel intake passage in advance of the venturi and the water jet, located in the venturi, in rear of the fuel jet tube would control the water supply, and the amount of water supplied would, in turn, control the degree of richness of the fuel-air ratios.

The admission of water and the flow is controlled automatically by the construction, arrangement and setting of the parts to give a high engine performance with a low grade fuel, which results in a reduction in operating cost as a result of the reduction in fuel consumption due to the more efficient operation of the engine and to the derichment of the carburetor.

Various changes may be made in the construction, combination and arrangement of the parts without departing from the spirit and scope of the invention as set forth by the claims.

I claim:

1. In a water injection regulator system for an internal combustion engine, a water regulator comprising a casing having a chamber, a diaphragm across said chamber dividing said chamber into high and low pressure chambers, a source of water supply having a water inlet valve operated by the diaphragm, a water conduit controlled by said valve and connected to the low pressure chamber for supplying water to said low pressure chamber, a carburetor for the engine having an ordinary venturi therein to produce high and low pressure areas therein, a connection from the high pressure portion to the chamber at one side of the diaphragm to the high pressure area of said carburetor, an auxiliary venturi within the first mentioned venturi of the carburetor having a low pressure area, and a low pressure connection between the low pressure area of the diaphragm chamber and the inside of the auxiliary venturi.

2. In a water regulator system for an internal combustion engine, a water regulator having a diaphragm in a chamber thereof dividing the chamber into separate high and low pressure portions, a source of water supply for the low pressure portion of said chamber having a water inlet valve operated by the diaphragm for admitting water to said low pressure portion of the chamber, a carburetor for the engine having an ordinary venturi between the choke and throttle valves, a boost venturi within the other venturi, a fuel inlet from the carburetor into the boost venturi for supplying fuel into the carburetor through said boost venturi, a high pressure connection from the carburetor to the high pressure portion of the diaphragm chamber, and a low pressure connection from the low pressure portion of the boost venturi to the low pressure water inlet portion of the diaphragm chamber of the water regulator for supplying water into said boost venturi to regulate the fuel supplied therethrough.

3. In a water injection device for introducing water into the fuel mixture supply for an internal combustion engine having a carburetor having a Venturi intake passage with a fuel introducing jet associated therewith for introducing fuel into the engine in proportion to the passage of air through said venturi, and past said jet, a water introduction jet means located in said venturi, in rear of said fuel jet, for introducing water into said venturi through said water jet in proportion to the suction in said venturi caused by the passage of the air and fuel mixture therethrough to regulate the rate of introduction of the fuel in said mixture in proportion to the velocity of the mixture passing through said venturi and in proportion to the rate of water introduced through said water introduction jet.

4. In a water injection system for internal combustion engines having a carburetor for introducing a fuel and air mixture into the engine in predetermined proportions to the speeds of operation of the engine, said carburetor having a Venturi air inlet with a fuel jet therein for supplying fuel to the air passing said jet, a water introducing jet in said venturi, in rear of said fuel introducing jet, normally closed water control valve means for controlling the delivery of water to said water introducing jet, and fluid pressure actuated means operable by said engine for opening said valve means incident to the operation of the engine.

5. In a water injection system for internal combustion engines having a carburetor for introducing a fuel-air mixture into the engine in predetermined proportions to the operation of the engine means for introducing water into said fuel and air mixture in predetermined ratio to the operation of the engine, to decrease the richness of the fuel and air mixture in predetermined ratio to the rate of introduction of said water, said means comprising an air intake venturi located therein in the carburetor having a water introduction jet located substantially at its point of greatest suction pressure and a fuel supply jet located in said venturi in advance of said water introducing jet, whereby the rate of water introduced proportionally reduces the suction pressure between the venturi and the engine at the fuel supply jet, to reduce the suction in the venturi at the fuel introducing jet.

6. In a water injection system for an internal combustion engine, having a carburetor for supplying a combustible fuel mixture to the engine, said carburetor having a fuel inlet with a Venturi passage therethrough, a water injection jet located in the said Venturi passage at substantially the point of maximum negative pressure when the fuel mixture is passing therethrough, a fuel injection jet in the venturi located in advance of said water injection jet and adjacent thereto, a source of water supply, a differential pressure controlled valve for regulating the flow of water from said source of water supply to said water injection jet having a high pressure connection to the carburetor in advance of said water injection jet and said venturi and a lower pressure water supply connection between said water regulating pressure controlled valve and said water injection jet.

7. In a water injection system for internal combustion engine, having a carburetor for supplying a combustible fuel mixture to the engine, said carburetor having a fuel inlet with a Venturi passage therethrough, a water injection jet located in the said Venturi passage at substantially the point of maximum negative pressure when the fuel mixture is passing therethrough, a fuel injection jet located in the venturi in advance of said water injection jet and adjacent thereto, a source of water supply, a differential pressure controlled water supply regulating valve device having a low differential pressure water delivery conduit between said valve and the water injection jet for regulating the flow of water from said source of water supply through said low pressure conduit to said water injection jet a high differential pressure connection between the differential pressure device and the carburetor in advance of said low pressure water supply jet and said venturi and adjustable water metering means in said low pressure water delivery conduit.

8. A water injection system for an internal combustion engine having a carburetor and an oil pressure line which is pressurized only during the operation of the engine, comprising a water supply line having a normally closed water control valve therein and oil pressure operated actuating means for said valve, connected in the oil pressure supply line for opening the water control valve only during operation of the engine, a water injection regulator having a diaphragm chamber, a diaphragm dividing the chamber into a relatively high pressure water valve actuating chamber and a relatively low pressure water supply chamber, high and low pressure connections respectively from the high and low pressure chambers connecting the high and low pressure points in the carburetor for effecting differential pressures in said high and low pressure chambers at opposite sides of the diaphragm during the operation of the engine, a water delivery line between the water supply line and the low pressure water regulator chamber, a valve in said water delivery line normally closing the same, having operating means disposed for opening engagement by the diaphragm incident to movement thereof toward the low pressure chamber to admit water from said water delivery line into said low pressure chamber, for delivery of said water through said low pressure connection from said low pressure chamber to the low pressure point in the carburetor.

9. In a water injection system an internal combustion engine having a carburetor with high and low suction pressure points therein, a water regulator having a closed diaphragm chamber, a diaphragm across said chamber dividing the chamber into a closed high pressure chamber and a separate low pressure water delivery chamber, disposed at opposite sides of the diaphragm, high and low pressure conduit means connecting said high and low pressure chambers respectively to the high and low pressure points of the carburetor, a source of water supply connected to said low pressure water delivery chamber, a normally closed water inlet control valve in said water supply connection for controlling the delivery of water to said low pressure water delivery chamber, said valve having an actuating stem engageable by said diaphragm incident to movement thereof toward said low pressure water supply chamber by differential pressure in said high pressure chamber to actuate the valve to open position to admit water into said low pressure water supply chamber and through said low pressure conduit means to the low pressure point of the carburetor.

10. In a water injection system for internal combustion engines having a carburetor with high and low fluid pressure points and an oil pressure supply line pressurized only during the operation of the engine, a water regulator device having a closed chamber therein, a diaphragm across said chamber dividing the chamber into separate high and low pressure chambers, separate tubular high and low fluid pressure connections from the high and low fluid pressure points of the carburetor to the high and low pressure chambers of the regulator device at opposite sides of the diaphragm, a water supply line connected to the low pressure chamber for supplying water into said low pressure chamber for delivery through said low pressure connection into the carburetor at its low fluid pressure point, a normally closed water inlet valve for said water supply line having a valve stem disposed in said low pressure chamber for opening engagement by said diaphragm incident to movement of the diaphragm toward the low pressure chamber and a normally closed water flow control valve device in said water supply line having a pressure operated valve actuating diaphragm connected to said oil pressure supply line to be actuated by the pressure therein to open said water flow control valve only during the operation of the engine.

11. In a water injection system for internal combustion engines having a carburetor with adjacent relatively high and low fluid pressure points, a water regulator comprising a casing having a closed chamber therein, a diaphragm disposed across said chamber dividing the same into a closed high pressure chamber and a closed separate low pressure water receiving chamber, a tubular connection between the high pressure point of the carburetor and the high pressure chamber of the water regulator, a separate tubular water delivery conduit between the lower portion of the low pressure water receiving chamber and the low pressure point of the carburetor for reducing the pressure in said low pressure water receiving chamber during the operation of the engine to flex the diaphragm toward said low pressure chamber and to convey water from said low pressure water receiving chamber into the carburetor at the low pressure point thereof, adjustable water metering means in said low pressure conduit for controlling the flow of water from the low pressure water chamber to the carburetor low pressure point to meter the flow of water into the carburetor in predetermined ratio to the differential pressures on the opposite sides of the diaphragm, and normally closed diaphragm operated water supply valve means for supplying water to said low pressure water chamber having an operating stem disposed for opening engagement by the diaphragm incident to flexing thereof toward said low pressure water chamber.

12. In a water injection system for an internal combustion engine having a carburetor for supplying a combustible fuel mixture to the engine, said carburetor having a Venturi fuel intake passage, a water injection jet located in the said fuel Venturi passage at substantially the point of maximum negative pressure when a fuel mixture is passing therethrough, a fuel injection jet located in the venturi, in advance of the water injection jet and adjacent thereto for supplying fuel in predetermined ratio to the air and water passing through said venturi during the operation of the engine, a source of water supply, a differential pressure controlled valve device, for regulating the flow of water from said source of water supply to said water injection jet, said device having a low pressure water supply passage to said water injection jet and a high pressure connection to the carburetor in advance of said low pressure water injection jet in said venturi, and fluid pressure operated control valve means between said source of water supply and said differential pressure controlled valve device operable by variation in pressure to control the flow of water from said source of water supply to said differential pressure controlled valve device and fluid pressure initiating means operable by the engine for establishing said pressure in said fluid pressure operated valve means during the operation of the engine to admit water to said differential pressure controlled valve.

13. In a water injection system for an internal combustion engine having a carburetor with an intake passage with spaced choke and throttle valves in said passage, a fuel and water introducing venturi in said passage between the throttle and choke valves having a fuel injection jet located approximately at the Venturi maximum negative pressure point and a water injection jet located just in advance of the fuel injection jet, whereby the introduction of water into the venturi in advance of the introduction of fuel in the venturi produces a spoiling effect on the fuel introduction and the maximum negative pressure, to determine the amount of fuel introduced at said fuel jet in predetermined ratio to the amount of water introduced in said venturi at said water injection jet in advance of the fuel.

14. Apparatus as claimed in claim 13 including a water injection control device comprising a diaphragm chamber having a water valve actuating diaphragm therein dividing said chamber into a closed high pressure chamber and a closed low pressure water supply chamber, a water supply conduit connected to said low pressure chamber having a normally closed water supply valve therein disposed for opening engagement by the diaphragm incident to flexing of the diaphragm toward said low pressure chamber, a low pressure water delivery conduit between the lower portion of said low pressure chamber and the said water injection jet for the supplying of water admitted into said low pressure chamber to said water injection jet in proportion to the suction pressure in the venturi, and a high or differential fluid pressure supply conduit from said high pressure chamber connecting the carburetor air intake passage at a high pressure point therein between the venturi, and the choke valve, whereby variation in the opening and closing positions of the choke and throttle valves does not materially change the differential pressure ratio in the high and low pressure fluid and water conduits and in the high and low fluid pressure chambers when the velocity and quantity of the air passing through said carburetor air intake passage is substantially the same.

15. Apparatus as claimed in claim 13 including normally closed water supply control means connected to the water injection jet, and differential pressure operated means for opening said normally closed water supply control means having low and high pressure conduits connected respectively to water injection jet, and to said air intake passage in advance of the venturi between the same and the choke valve supplementary normally closed water supply control means for supplying water to said first mentioned water supply control means including a fluid pressure opened water control valve and fluid pressure initiating means operable only during the operation of the engine for actuating the last mentioned fluid pressure opened water control valve to admit water to the first mentioned water supply control means only during the operation of the engine.

PAUL F. ADAIR.

REFERENCES CITED

The following references are of record in the file of this patent:

UNITED STATES PATENTS

| Number | Name | Date |
|---|---|---|
| 1,530,464 | Leedom | Mar. 17, 1925 |
| 1,897,742 | Viel | Feb. 14, 1933 |
| 2,076,606 | Winter | Apr. 13, 1937 |
| 2,332,440 | Ericson | Oct. 19, 1943 |

FOREIGN PATENTS

| Number | Country | Date |
|---|---|---|
| 303,736 | England | Feb. 14, 1929 |
| 497,674 | England | Dec. 23, 1938 |